United States Patent

[11] 3,597,552

[72] Inventor Hirokazu Goto
Tokyo, Japan
[21] Appl. No. 869,306
[22] Filed Oct. 24, 1969
[45] Patented Aug. 3, 1971
[73] Assignee Nippon Electric Company, Limited
Tokyo, Japan
[32] Priority Oct. 25, 1968
[33] Japan
[31] 43/78113

[54] SYSTEM SYNCHRONIZATION SYSTEM FOR A TIME DIVISION COMMUNICATION SYSTEM EMPLOYING DIGITAL CONTROL
8 Claims, 17 Drawing Figs.

[52] U.S. Cl. 179/15 BS, 178/69.5 R
[51] Int. Cl. H04j 3/06
[50] Field of Search 179/15 BS; 178/69.5 R

[56] References Cited
UNITED STATES PATENTS

| | | | |
|---|---|---|---|
| 3,136,861 | 6/1964 | Mayo | 179/15 BS |
| 3,404,230 | 10/1968 | Hailey | 178/69.5 R |
| 3,488,440 | 1/1970 | Logan | 178/69.5 R |
| 3,504,287 | 3/1970 | Deregnaucourt | 179/15 BS |

*Primary Examiner*—Ralph D. Blakeslee
*Attorney*—Sandoe, Hopgood and Calimafde

ABSTRACT: A synchronization system for use in a time-division communication system makes almost exclusive use of digital circuits. Those circuits include means for detecting the phase differences between incoming clock signals from other stations and a reference clock signal of a particular station, and means for controlling the insertion or deletion of pulses into or from a reference clock pulse train in response to the sensed phase differences.

INVENTOR.
HIROKAZU GOTO
BY
Sandoe, Hopgood & Calimafde
ATTORNEYS

PATENTED AUG 3 1971 3,597,552

INVENTOR.
HIROKAZU GOTO
BY
Sandoe, Hopgood & Calimafde
ATTORNEYS

SYSTEM SYNCHRONIZATION SYSTEM FOR A TIME DIVISION COMMUNICATION SYSTEM EMPLOYING DIGITAL CONTROL

This invention relates generally to time division communication systems and, particularly, to a synchronization system for a time division communication system.

Several synchronization systems have been proposed for use in a time division communication system. The mutual synchronization system is one of these conventional systems such as described in Bell System Technical Journal of Dec. 1966, p. 1989. In this system, each of the stations which constitute a subsystem thereof, comprises a phase-controlled oscillator having a plurality of input terminals as a clock source. The clock source has the function of comparing the phase of its associated station with that of the clock sources of the other stations. All clock sources are thus controlled by one another, and a clock frequency (system frequency) common to all stations is determined. In other words, the individual clock sources all share in the determination of the system frequency. This system makes it possible not only to compose a perfect synchronization system in which the whole system is synchronized by one clock frequency common to all stations, but also reduces the influences of the clock sources and of the transmission lines upon the reliability of the stations. Moreover, that known system provides reserve flexibility allowing for future modifications or expansion of the system.

In the conventional mutual synchronization system, however, the phase-controlled oscillator have a plurality of input terminals, which is the clock source of each station, is composed of analog circuits. That is, the fundamental circuits in the oscillator such as the phase comparator for detecting the phase differences between the signal of the own station and that of another station, the converter circuit for converting the detected phase differences into suitable control signals such as voltage or current signals, and the variable frequency oscillator which changes its oscillation frequency according to the control signal, are all analog circuits. It is often observed that the characteristics of these analog circuits differ to some extent according to the individual station due to the initial characteristic dispersion of the circuit elements, and that these analog circuits tend to cause drifts in a system due to variations in the environmental variations, such as power source voltage or ambient temperature variation. Drift in the system may also be a result of characteristic variations of the circuit elements attributable to aging and environmental variations, etc. The variations or drifts in the characteristics of the circuits directly affect the system frequency, and thus adversely affect the stability of the system frequency. To compensate for such characteristic variation and drift, it is necessary in the known oscillators to provide various additional circuits which increase the cost and size of the system and lower its reliability.

It is an object of this invention to provide an improved synchronization system, in which disadvantages of the known systems are avoided and which provides a highly stable, economical, and compactly manufacturable equipment.

In the synchronization system of this invention, each of the stations comprises a plurality of detecting circuits for detecting the phase differences between the incoming clock signals sent from the stations and the clock signal of its own stations. A plurality of counter circuits measure the phase differences in a digital fashion; a plurality of memory circuits memorize the outputs of the counter circuits in response to the phase differences. A plurality of computing circuits are provided for computing the differences between the phase differences and a preset reference phase difference and a weighted mean value computing circuit is provided for weighting and averaging the outputs of the computing circuits. The insertion or deletion of pulse groups into or from a reference clock pulse train is controlled by the output of the weighted mean value computing circuit and a smoothing circuit is provided to smooth the output pulse train of the control circuit, wherein the smoothed pulse train is used as the clock pulse for each of the stations.

All of the above described circuits in the present invention except for the reference oscillator can be in the form of digital circuits. Therefore, the stability of the system can be markedly improved. Furthermore, by employing integrated circuits, it is readily possible to form a system of this type having low cost, high reliability, and being small in size and of standardized construction.

To the accomplishment of the above and to such further objects as may hereinafter appear, the present invention relates to a synchronization system for a time division communication system employing digital control, substantially as defined in the appended claims and as described in the following specification taken together with the accompanying drawings in which:

Figure 1:
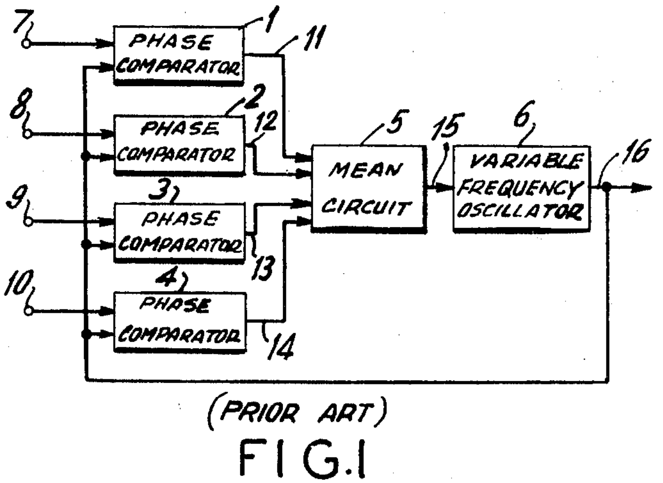
(PRIOR ART) FIG.1
FIG. 1 is a block diagram showing an example of a conventional phase-controlled oscillator with a plurality of input terminals used in a synchronization system for a plurality of stations according to the prior art.
Figure 2A:
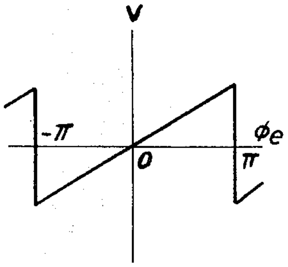
FIG. 2 is a diagram for explaining the operation of FIG. 1.
Figure 2B:
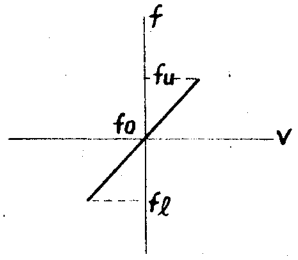

A conventional phase-controlled oscillator is shown in FIG. 1, has a plurality of input terminals used for the conventional mutual synchronization system. In the oscillator herein shown, the phase control oscillator has four input terminals respectively applied to one of the inputs of phase comparators 1, 2, 3 and 4, each of which has a function of converting the phase difference into, for example, a voltage, and has a phase difference vs. voltage characteristic, such as a saw tooth wave characteristic, as shown in FIG. 2*a*. This characteristic can be realized, for example, by the combination of flip-flop and a low-pass filter associated with the phase comparator. The outputs of phase comparators 1—4 are connected to a weighted mean circuit 5, for which a resistance adder circuit based on Kirchfoff's law, or an adder circuit using an operational amplifier used for analog computers may be advantageously employed. The output of circuit 5 is connected to the input of a variable frequency oscillator 6, or a voltage controlled oscillator when the control signal is in the form of voltage. The characteristics of oscillator 6 is such that, as shown in FIG. 2*b*, the control voltage has a linear relationship with the oscillation frequency, assuming that the center frequency is $f_o$, the variable upper limit frequency $f_r$, and the variable lower limit frequency $f_l$. An element having a value of which is changed according to the applied voltage, such as a quartz oscillator with a varactor, may be used as the variable frequency oscillator 6.

The operation of the phase-controlled oscillator and the mutual synchronization system, in which this phase-controlled oscillator is used as the clock source, will be briefly described referring to FIG. 1. The clock signals 7, 8, 9 and 10 applied to the respective input terminals from other stations are phase-compared with the clock signal 16 of the own station by the individual phase comparators 1, 2, 3 and 4, respectively. The resultant detected phase differences are converted into control voltages which appear at lines 11, 12, 13 and 14 respectively, and are then applied to the weighted mean circuit 5. As shown in FIG. 2*a*, the control voltages are proportional to the detected phase differences. The weighted mean circuit 5 provides a suitably set weighting onto these input signals, and delivers a weighted mean control voltage output at line 15. This control voltage output controls voltage controlled oscillator 6 to change its clock frequency. At this moment, the voltage controlled oscillator has the characteristic shown in FIG. 2*b* and, accordingly, the variation in the clock frequency is proportional to the voltage obtained from circuit 5. That voltage is also proportional to the weighted mean phase difference so that the variation in the clock frequency is proportional to the weighted mean value of the phase difference detected by the individual phase comparators.

The synchronization system in which the phase-controlled oscillator of FIG. 1 is provided in each station is synchronized by one system frequency common to all other stations, and this frequency is determined by the characteristics of the phase-controlled oscillators of all stations and by the delay times of all the transmission lines between stations. It is known that the system frequency stands at nearly the mean value of the center frequency of the voltage controlled oscillators of all stations. On the other hand, in a mutual synchronization system employing the plural input phase-controlled oscillator comprising analog circuits, the system frequency is varied directly by the variations in the characteristics of the phase-controlled oscillators of the stations, which may be caused by variation in the environmental conditions such as power source voltage, ambient temperature, humidity, and the like. Further variations in the system frequency may result from changes in the characteristic of the circuit elements due to aging and changes in the environmental conditions, etc. For example, the variation in the power source voltage applied to the phase comparator serves to change the voltage applied to the voltage controlled oscillator. As a result, the oscillation frequencies of the stations are varied, and the system frequency is accordingly varied. In the same sense, when the ambient temperature is varied, the characteristic of the varactor used for the voltage controlled oscillator is varied, and the system frequency is accordingly varied.

Thus a mutual synchronization system consisting of analog circuits, variation in the system frequency is likely due to variations in various conditions and to deteriorate the stability of the system is seriously, adversely affected. To avoid this, it is necessary to provide additional circuits, such as a voltage stabilizing circuit, temperature compensating circuit, etc. Such arrangement inevitably increases the cost of manufacture and decreases the reliability of the system and it is difficult to reduce the size of the equipment. Furthermore, when analog circuits are used, it is difficult to ensure uniformity of characteristics of the phase-controlled oscillator of each station and to standardize its production. A relatively complicated adjusting process is required and the cost of manufacture is therefore increased.

Figure 3:
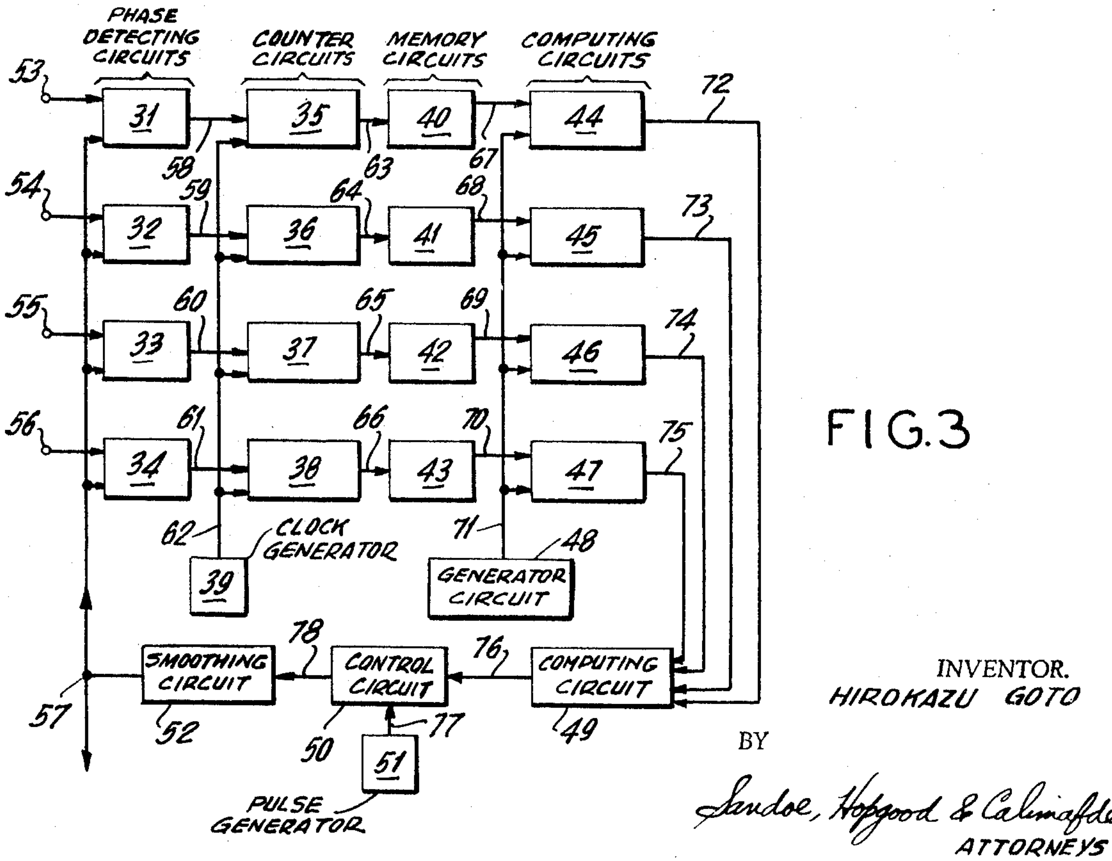
FIG. 3 is a block diagram showing an embodiment of the system synchronization system of this invention.

In order to remove the foregoing disadvantages, the system of the present invention makes use of digital circuits for performing digital controls whereby a mutual synchronization system is made operative at a higher stability and reliability and at a lower cost than in the conventional system. According to this invention, it is readily possible to reduce the size of the equipment by the use of integrated circuits. A clock oscillator embodying this invention as shown in FIG. 3 is installed in each station of the system. As in the prior art oscillator shown in FIG. 1, the oscillator of FIG. 3 is described for purposes of explanation having four input terminals. The constituent elements of this embodiment will be first explained. Circuits 31, 32, 33 and 34 detect the time differences, namely the phase differences, between the signals 53, 54, 55 and 56 obtained from the incoming clock signals from other stations and the signal 57 obtained from the clock signal of the own station. To form this circuit, various circuits are considered; for example, a flip-flop to be set by one input (such as a signal obtained from the incoming clock) and reset by another input (such as a signal obtained from the clock of the own station), an AND gate circuit operative by the two signals, an exclusive OR gate circuit, etc. Counter circuits 35, 36, 37 and 38 measure the values of the detected phase differences. An ordinary counter circuit including a reversible counter circuit may be used for the purpose of the counter circuit. The detected phase difference signals 58, 59, 60 and 61 are counted by the use of the clock pulse generated from the counting clock pulse 62 generator 39. The frequency of the counting clock pulse 62 is preferably higher than the frequency of the signal for which the phase difference is detected for the purpose of counting the phase difference signal at high accuracy. Memory circuits 40, 41, 42 and 43 are respectively connected to the outputs of counter circuits 35—38 and are effective to memorize the measured values 63, 64, 65 and 66 of the detected phase differences derived at these counter circuits. Various memory circuits, for example, registers using flip-flops, may be used for these memory circuits. These memory circuits may be omitted when the counter circuits 35—38 are provided with the function of inhibiting the counting clock pulse 62 and thereby holding the measured values. Computing circuits 44, 45, 46 and 47 are respectively connected to the outputs of memory circuits 40—43 for computing the differences between the measured values 67, 68, 69 and 70 of the phase differences respectively stored in these memory circuits and the reference phase signal 71 generated by a phase signal generator circuit 48. For the purpose subtractor circuits of the type commonly used in digital electronic computers may be used as the computing circuits. However, simple comparator circuits may be used as the computing circuits when the only determination to be made is whether the measured value is larger or not larger than the reference phase signal or whether the former is larger or smaller than or equal to the latter. A weighted mean value computing circuit 49 is connected to the outputs of the computing circuits 44—47 for suitably weighting the outputs 72, 73, 74 and 75 of the computing circuits and for computing their mean value. Various computing circuits, such as those used in digital electronic computers, may be employed for the weighted mean value computing circuit 49. Also, the so-called majority decision logic circuit may be employed for the weighted mean value computing circuit when this computing circuit is to be used for determining whether the measured value is larger or not larger than the reference phase signal, or whether the former is larger or smaller than the latter or equal to the latter.

A control circuit 50 is connected to the output of circuit 49 for inserting a suitable number of pulse groups into the clock pulse train 77 generated from a reference clock pulse generator 51 according to the output 76 of the mean value computing circuit 49, and for removing a suitable number of pulse groups from the clock pulse train 77. This circuit may be realized by the combination of logic circuits. For operation where one pulse is to be inserted or removed, said control circuit can be easily formed by combining a circuit which generates one bit pulse synchronized with the clock pulse and an OR gate circuit or an inhibiting circuit.

A smoothing circuit 52 is connected to the output of control circuit 50 for smoothing a sharp phase variation of the clock pulse train 78 into which or from which a suitable number of pulse groups are inserted or removed by the use of control circuit 50. A demultiplier circuit using a counter circuit may be employed for this smoothing circuit. In some cases, an analog circuit, such as a phase-controlled oscillator, may be used with a demultiplier circuit in order to more effectively smooth said phase variation. In this case, the use of an analog circuit will not greatly affect the stability of the system, because a simple analog circuit will suffice, if the need arises.

Figure 4:
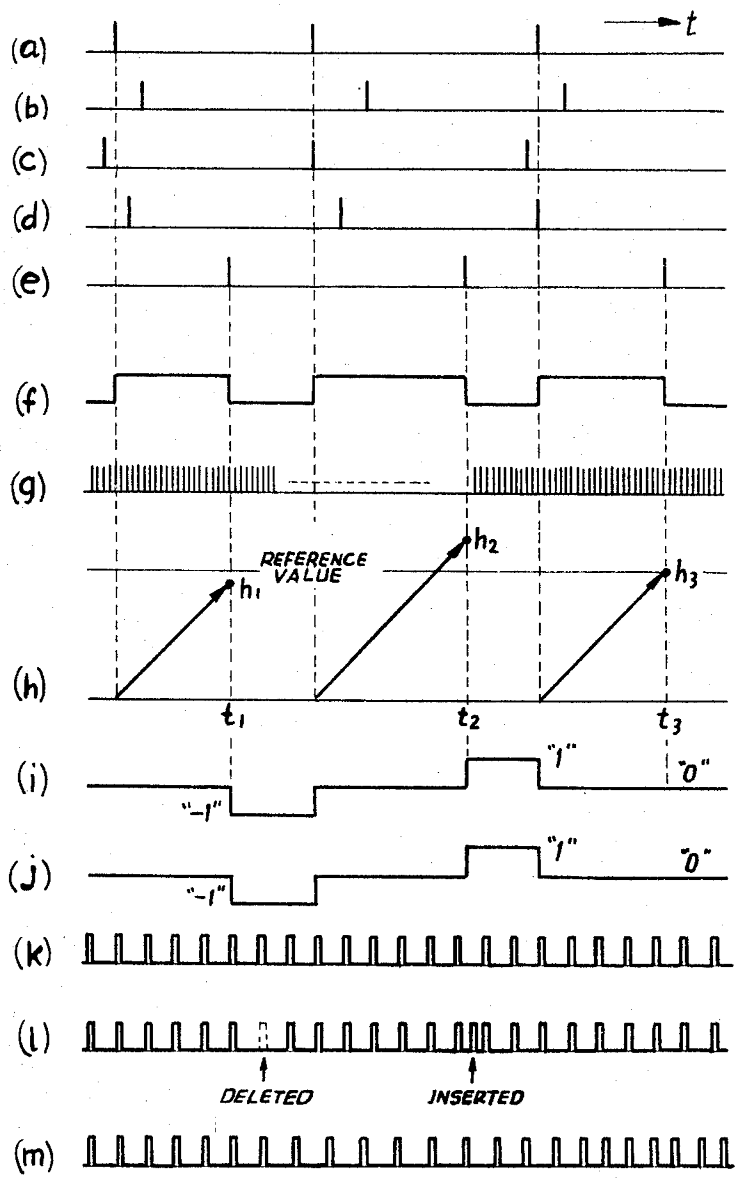
FIGS. 4*a–m* illustrate the operating waveforms for explaining the principle of the synchronization system of this invention.

The operation of the clock oscillator of FIG. 3 is now explained below with reference to the waveform diagrams of FIG. 4.

According to a preferred embodiment of the system of FIG. 3, flip-flops are used for the phase detecting circuits 31, 32, 33 and 34; up-counter circuits are used for the counter circuits 35, 36, 37 and 38; large/equal/small judging comparator circuits is used for the computing circuits 44, 45, 46 and 47 which compute the differences between the measured phase difference values and the reference values; a majority decision circuit is used for the weighted mean value computing circuit 49; a one-bit control circuit is used for the reference clock pulse control circuit 50; and, a phase controlled oscillator is used for the smoothing circuit 52. FIGS. 4*a*, *b*, *c* and *d* show the time relationships of the signals corresponding to the signals 53, 54, 55 and 56 obtained from the incoming clock signals (FIG. 3). These time relationships are compared as to their phase with the time relationship of the signal of FIG. 4*e* which corresponds to the signal 57 obtained from the clock signal of the own station, by the use of the detecting circuits 31, 32, 33 and 34 respectively. For example, in the case of signals 53 and 57, a phase difference signal 58 shown in FIG. 4*f* is detected. In other cases, namely in the case of signals 54 and 57, 55 and 57, and 56 and 57, the phase difference signals 59, 60 and 61 are similarly detected, although they are not shown in FIG. 4. The detected phase difference signals 58, 59, 60 and 61 are applied to the counter circuits 35, 36, 37 and 38, respectively. The phase differences of these detected signals are then counted by the clock pulse 62 shown in FIG. 4 *g* generated from the counting clock generator 39. FIG. 4*h* is a graphic representation of the contents of the counter circuit operated for measuring the phase difference 58 (FIG. 4*f*) between the signals 53 and 57. The ordinate represents the contents of the counter. The measured values $h_1$, $h_2$ and $h_3$ are obtained at the times $t_1$, $t_2$ and $t_3$. Practically the values are varied digitally at each clock, but the diagram shows them analogously. The values of other detected phase difference signals 59, 60 and 61 are measured in the same manner as above. The measured value 63 of the counter circuit 35, namely, $h_1$, $h_2$ and $h_3$ (at times $t_1$, $t_2$ and $t_3$ respectively) is stored in the memory circuit 40. The measured values 64, 65 and 66 of the other counter circuits 41, 42 and 43 are stored in the same manner. The measured values 67, 68, 69 and 70 stored respectively in the memory circuits 40, 41, 42 and 43 are compared with the reference phase value 71 generated from the reference phase value generator circuit 48, namely, the reference value $r$ as shown in FIG. 4*h*, by the comparator circuits 44, 45, 46 and 47 respectively. The results of these comparisons are the outputs 72, 73, 74 and 75. As to the phase difference as shown in FIG. 4*f* between the signals 53 and 57, the measured value $h_1$ at time $t_1$ is smaller than $r$. Accordingly the output of the judged or compared result is "-small". While, the measured value $h_2$ is larger than $r$ at time $t_2$, therefore the result of this judgement is "large." The value $h_3$ is equal to $r$ at time $t_3$, thus an output "equal" is delivered.

Assume that the values "−1," "0" and "+1" are assigned to "small," "equal" and "large" respectively. Thus, in the case of the phase difference signal 57 of FIG. 4*f*, the outputs of the judged results as shown in FIG. 4*i* will be "−1" at time $t_1$, "+1" at $t_2$, and "0" at $t_3$. The results of all the judgement outputs 72, 73, 74 and 75 are treated in terms of majority decision by the majority decision circuit 49. By this operation, the result of highest occurrence frequency among "−1," "0" and "+1" is found. In this case, it is necessary that a greater privilege of participating in the making of the majority decision be given to the judged result of a station having a relatively large weight.

The judged result 76 as shown in FIG. 4*j* which has been subjected to a majority decision process is applied to the reference clock pulse control circuit 50 whereby one bit of control is done on the clock pulse train shown in FIG. 4*k* generated from the reference clock pulse generator 51. For example, the "one bit removal" command is delivered when the judged result is "−1," and "one bit insertion" command is given when the judged result 76 is "+1." If the result is "0," no control is performed. The resulting clock pulse train as shown by 78 which is controlled in the manner described above is shown in FIG. 4*l* to or from which one bit of pulse is inserted or removed. Because this pulse train contains an abrupt phase variation, such phase variation is smoothed by a smoothing circuit 52 having a phase-controlled oscillator. As a result the smoothed clock pulse train shown in FIG. 4*m* is obtained. This smoothing circuit may be formed of a demultiplier circuit based on digital circuit.

For simplicity of explanation, FIG. 4*m* shows the example of a phase-controlled oscillator. The smoothed clock pulse train is converted into a suitable form, and is then fed back to the phase difference detecting circuits 31, 32, 33 and 34 as a signal 57 of the own station for the purpose of phase difference comparison. As will be obvious from the above description, the smoothed clock pulse train is at a frequency controlled by the outputs of the phase difference detecting circuits. In other words, the frequency of the smoothed clock train is a mean frequency of the incoming clock pulses.

Thus, by installing a clock oscillator functioning as described above in each station, a mutual synchronization system can be formed. In addition, when a phase-controlled oscillator is used for the smoothing circuit, all the circuits except the smoothing circuit can be made up of digital circuits, or when a phase-controlled oscillator is not used, every circuit can be a digital circuit. Since, in any case, important operations are under digital control, it is possible to increase the stability as well as the reliability, of the system, and to lower the cost of manufacture. By using integrated circuits for forming the digital circuits, an even higher reliability can be obtained at a lower cost, and the equipment can be constructed into a smaller size.

The foregoing specification covers the comparator circuits 44, 45, 46 and 47 and the majority decision circuit 49 and the reference clock pulse control circuit 50, which are controlled under three states "−1," "0" and "+1" used as logic signals. This logic circuit is called a three-value logic circuit. When a pair of two-value logic circuits are used instead of the three-value logic circuit, it is possible to handle three states, by the use of two states "1" and "0" of the two-value logic circuits separated spatially from each other, as "+1" and "−1" states or as combinations of two bits "01," "10" and "11" corresponding to "−1," "0" and "1." It is apparent, therefore, that the three states "1" "0" "−1" mentioned above are given only as examples for the purpose of simplifying the description.

In the foregoing specification, a few specific embodiments of the invention have been described by way of example. Needless to say, different kinds of circuits may be employed for the same purposes. In addition, when a pulse group is inserted or deleted to or from the reference clock pulse train at once, the number of the pulse group may be controlled linearly or nonlinearly in response to the measured and averaged phase difference. In other words, in the case of the linear control, the control value (phase difference value) is proportioned to the controlled value (number of pulses to be inserted thereinto or removed therefrom).

The foregoing specification refers only to the instance where a phase difference detecting circuit, a phase difference counter circuit, a measured value memory circuit, and a computing circuit are independently disposed with respect to each input signal. However, these circuits may be jointly disposed and operated in common for all input signals. It may also be arranged that the input signals are split into a plurality of groups. In this case, the input signal for each group, and such common parts are used as time division fashion, whereby a simpler equipment may be obtained.

Thus while only a single embodiment of the present invention has been herein specifically described it will be apparent that modifications may be therein without departing from the spirit and the scope of the invention.

I claim:

1. A synchronization system for a plurality of stations in a time division communication system for generating a pulse train to be used as the clock pulse for each of said stations, said system comprising means for detecting the phase differences between the incoming clock signals sent from other stations and the clock signal of its own; means operatively connected to said detecting means for measuring said phase differences in a digital fashion; means operatively connected to said measuring means for computing the differences between said phase differences and a preset reference phase difference; means operatively connected to said computing means for weighting and averaging the outputs of said computing means, and means operatively connected to said weighting and averaging means for controlling the insertion or deletion of pulse groups into or from a reference clock pulse train in response to the output of said weighting and averaging means.

2. The system of claim 1, further comprising means operatively connected to said controlling means for smoothing the output pulse train thereof.

3. The system of claim 1, further comprising means operatively interposed between said measuring means and said computing means for memorizing the outputs of said measuring means.

4. The system of claim 3, in which said measuring means comprises counting means.

5. The system of claim 4, in which said computing means comprises means for judging whether the output of said counting means is greater than, equal to, or less than said reference phase difference and for deriving a characteristic output signal as a result of said judging.

6. The system of claim 5, in which said weighting and measuring means comprises means for sensing the characteristic output signals from said computing means and to derive a control signal according to which of said characteristic output signals is of the greatest number.

7. The system of claim 1, in which said detecting means, said measuring means, said computing means, said weighting and averaging means, said controlling means, and said smoothing means, are all in the form of digital circuits.

8. The system of claim 6, in which said detecting means, said measuring means, said memorizing means, said computing means, said weighting and averaging means, said controlling means, and said smoothing means, are all in the form of digital circuits.